United States Patent [19]

Fiorentini

[11] Patent Number: 4,832,499
[45] Date of Patent: May 23, 1989

[54] APPARATUS FOR FEEDING AND METERING FLUID COMPONENTS TO A HIGH PRESSURE MIXING HEAD

[75] Inventor: Carlo Fiorentini, Caronno Pertusella Varese, Italy

[73] Assignee: AFROS S.p.A, Varese, Italy

[21] Appl. No.: 938,400

[22] Filed: Dec. 5, 1986

[30] Foreign Application Priority Data

Dec. 6, 1985 [IT] Italy ............................... 23119 A/85

[51] Int. Cl.$^4$ ............................................. G05D 11/02
[52] U.S. Cl. .................................... 366/152; 222/55; 222/135; 366/160
[58] Field of Search ................................ 366/151-153, 366/160, 162, 167, 173; 137/99; 222/55, 135, 136, 334

[56] References Cited

U.S. PATENT DOCUMENTS

| | | | |
|---|---|---|---|
| 3,776,252 | 12/1973 | Wilcox | 137/99 |
| 3,865,126 | 2/1975 | Baggaley | 137/99 |
| 4,126,399 | 11/1978 | Schneider et al. | 366/160 |
| 4,209,258 | 6/1980 | Oakes | 366/152 |
| 4,279,360 | 7/1981 | Häuser | 222/135 |
| 4,494,676 | 1/1985 | Berweger | 222/135 |

Primary Examiner—Harvey C. Hornsby
Assistant Examiner—Corinne M. Reinckens
Attorney, Agent, or Firm—Cushman, Darby & Cushman

[57] ABSTRACT

An apparatus for feeding and metering fluid components to a mixing head, in particular for metering and feeding reactive chemical components to a high pressure mixing head. The apparatus comprises at least a first and second transfer cylinder whose control unit is fed with hydraulic fluid from a single source of constant pressure, and whose component pumping unit is connected to a tank for the component, respectively to an inlet aperture for the component in a chamber of the mixing head, by means of a proportional servo valve which is controlled in relation to the rate of flow of the components so as to keep both the pressure and the flow of the components to be mixed constant.

5 Claims, 1 Drawing Sheet

APPARATUS FOR FEEDING AND METERING FLUID COMPONENTS TO A HIGH PRESSURE MIXING HEAD

BACKGROUND OF THE INVENTION

This invention relates to an apparatus for feeding and metering fluid components to a mixing head, in particular for feeding and metering reactive chemical components such as polyhidric alcohol and isocyanate or others, to a high pressure mixing head.

There are generally-known apparatuses for metering and mixing two reactive chemical components, comprising a component metering and feeding assembly, in which the metering and feeding unit of each component consists of a hydraulically-actuated piston pump, connected to the storage tank of the component and, respectively, to a mixing head. In particular, the German patent DE-C-33 09 964 refers to an apparatus of the above-mentioned kind, in which the hydraulic circuits controlling the component feeding and metering units are connected to a delivery pump common to both circuits, of the type controlled in such a way that each of the hydraulic circuits for feeding the control fluid is provided with a flow control valve which can be controlled according to the speed of the piston assembly of each unit, and in which the hydraulic circuits are further connected to the control inlet of the fluid delivery pump.

It is also desirable to feed the chemical components into the chamber of a mixing head under controlled conditions with regard to pressure, temperature and quantity, so that the mixing takes place in the desired stoichiometric ratios and within the established reaction times, in order to prevent the mixture from solidifying before reaching the mould. In particular, in high pressure mixing heads, it is essential to have a precise adjustment of the component feeding pressure, which must be maintained at a pre-established constant value, due to the fact that this pressure in substance constitutes the energy that gives rise to the correct mixing of the two jets of components which impinge at high speed in the mixing chamber. At present, the pressure is adjusted manually at the beginning of each stage of the work, or at the startup of the installation, by acting on the injection nozzles of the mixing heads, without any possibility whatsoever of doing so while the apparatus is working in that it would involve stopping or interrupting the work.

The above constitutes a limit in the development of the present apparatus in that there are causes of disturbance or alteration of the mixing conditions, which can take place when the apparatus is working, about which nothing can be done immediately. The use of automatic control systems in addition to the already existing ones is rather unadvisable in the present apparatuses, in that it could cause disturbance or interference with the other existing control equipment, with the risk of causing the entire control system to resonate.

The problem of keeping the pressure and flow rate of the components constant in high pressure mixing heads is consequently of crucial importance. In the known apparatuses, it has therefore been suggested to control the constancy of the flow rates of the components, in relation to their feeding speed, and to vary the flow rate of the hydraulic control fluid in relation to variations in the aforesaid feed speed, whenever greater power is required in the metering units in order to keep the flow rates of both components constant. For this reason, with the known apparatuses, it is not possible by means of adjustment to affect the causes which tend to alter the pressure required for feeding and injecting the components into the chamber of a mixing head; causes which for the most part can be attributed to residual substances or solidified particles of components in the nozzles of the injectors which consequently give rise to variations in the component injection pressure and in the mixing conditions.

A scope of this invention is to provide an apparatus for metering and feeding reactive chemical components into high pressure mixing heads, which makes use of hydraulically-controlled piston-type pumping and metering units, by which it is possible to remedy the above-mentioned problems and to ensure that the components are fed into the mixing chamber at a constant pressure and rate of flow.

A further scope of this invention is to provide an apparatus as described above, which is extremely simple in structure, capable of operating with a single pump for the hydraulic control circuit and at the same time utilizes a single automatic control device, for each individual component, which is capable of ensuring constant pressure and flow rate values.

A still further scope of this invention is to provide an apparatus as described above, in which the hydraulic control circuit can operate with comparatively lower pressure values, due to the fact that the causes of loss of hydraulic power have been eliminated or reduced to a minimum.

SUMMARY OF THE INVENTION

The above has been made possible by completely reversing the conventional control criteria, that is to say, by operating in a way completely opposite to and not envisaged by the previously known automatic control systems. In other words, according to this invention, the pressure in the hydraulic control portion of the apparatus is kept unchanged so as to ensure that the individual components are always fed at a constant pressure, and constancy in the flow rate of each component is controlled by means of a proportional servo-valve interlocked with the speed of the piston assembly of the pumping unit and, more generally, to the flow rate of each component. Since the servo-valve acts directly and automatically on the member which controls the injection of the component into the mixing chamber, the apparatus thus eliminates all the causes which would tend to alter the feeding and mixing conditions of the components, by immediately and automatically coming into action during the actual mixing phase.

BRIEF DESCRIPTION OF THE DRAWINGS

This invention will be illustrated in greater detail hereunder, with reference to the figures of the accompanying drawings, in which.

Figures 1, 2:
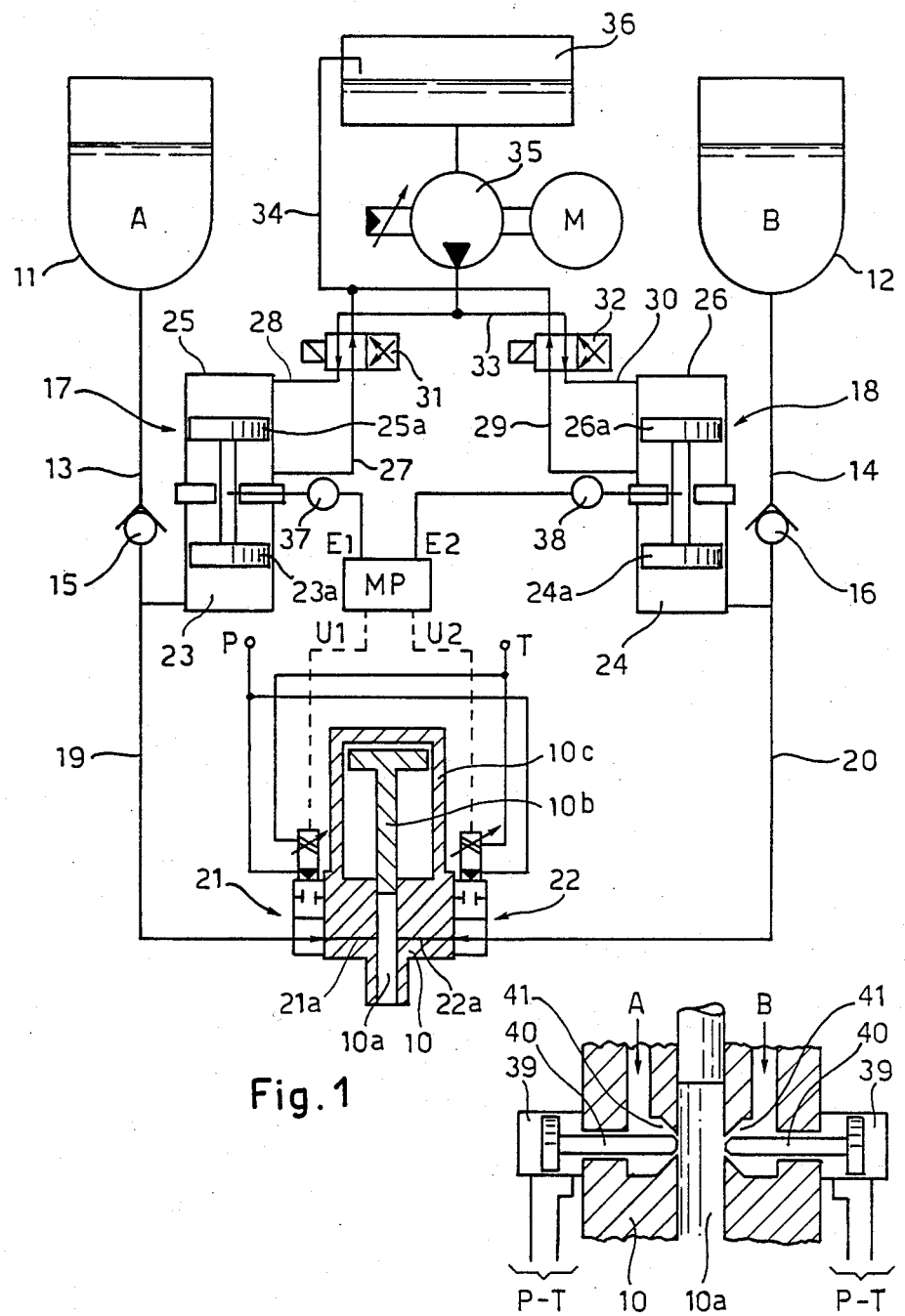
FIG. 1 shows a circuit diagram of the apparatus according to the invention.
FIG. 2 shows the operating mode of an injector forming part of a proportional servo-valve, according to the apparatus of the previous figure.

In the diagram of FIG. 1, the two components to be fed into a mixing head 10 of the high pressure type, for example polyol A and isocyanate B, are contained in their respective storage tanks 11 and 12. The mixing head 10 can be of any desired type or, as described in several prior patents, for example, of the type designed to enable the individual components to be recycled towards their respective storage tanks 11 and 12 by means of separate ducts and through recycling grooves provided in the cleaning plug 10b operated by a control cylinder 10c, as is described for example in a prior patent US-A-4332335 of the same applicant, the content of which constitutes an integral part of this description. The tanks 11 and 12 are connected by means of the ducts 13, 14 and the check valves 15, 16, to respective feeding and metering assemblies 17, 18 so that each individual component always flows in the direction of the pumping unit of each single assembly, and never in the opposite direction. Downstream of the check valves 15, 16, each feeding and metering assembly 17, 18 is connected to a respective inlet 21a, 22a for the components in the mixing chamber 10a, by means of ducts 19, 20 and proportional servo-valves 21 and 22, as shown, which can be adjusted to control the flow rates of the individual components, as explained further on; the servo-valves 21 and 22 are connected to a source P and, respectively, to a drainage T of a common hydraulic control fluid.

Each assembly 17, 18 for metering and feeding the chemical components A and B is made up, in a per se known way, of a transfer cylinder comprising a pumping unit 23, 24, hydraulically operated by a hydraulic control unit 25, 26; each unit 25, 26 consists of a hydraulic cylinder, such as a double-acting hydraulic cylinder, whose piston 25a, 26a is mechanically connected to the piston 23a, 24a of the relative pumping unit, by means of an intermediate rod or in any other way, in order to constitute a piston assembly which is movable linearly in either direction. The two chambers of the double-acting cylinders 25, 26 in the example shown, are connected by means of the ducts 27, 28, 29, 30, the flow reversing solenoid valves 31, 32 and the ducts 33 and 34, to the delivery side of a controlled pump 35, of the constant pressure type and, respectively, to a tank 36 containing the hydraulic fluid for the automatic pump 35. This particular hydraulic circuit controlling the two transfer cylinders 17, 18, constitutes an innovatory feature of the apparatus according to this invention, in that the use of an actuating pump 35 capable of supplying, at its delivery side, a hydraulic fluid at constant pressure, for controlling the transfer cylinders 17, 18, without the need for other intermediate control members, makes it possible not only to simplify the apparatus both structurally and functionally, thereby eliminating causes of breakdown or inefficiency, but also to feed the individual components A and B to the mixing head 10 with a constant pressure, proportional to the constant pressure of the same hydraulic control fluid.

Since residual substances could accumulate in corresponde with the nozzles or the inlet apertures 21a, 22a for the components in the mixing chamber of the head 10 due, for example, to solidified particles of mixture, or other accidental causes tending to give rise to variations in the flow rate could occur, with a consequent alteration in the stoichiometric ratios between the components A and B to be mixed, and in the optimal mixing conditions, according to a further feature of this invention, the servo-valves 21 and 22 for controlling the flows of components A and B have been subjected to interlocked to the rate of flow of the components to be controlled; this could be achieved, for example, by controlling the servo-valves 21, 22 in relation to the speed of travel of the piston assemblies 23a, 25a and 24a, 26a, so as to ensure the controlled feed of each individual component A and B by keeping it regulated at a constant initial value. The servo-valves 21 and 22 can be controlled or interlocked to the flow rates of the components A and B in any suitable way; for example, as shown, this can be achieved by providing means 37, 38 capable of sensing the speed of travel of the piston assemblies and of transmitting an electric operative signal proportional to the flow rates. The operative signals are sent to a corresponding data input E1, E2 of a processing unit MP which processes them and compares them with nominal speed or flow rate signals, according to a pre-established program, providing control signals at its outputs U1 and U2 which are sent to the control members of the servo-valves 21 and 22. These operate by controlling the flows of components entering the mixing chamber, keeping them constant, according to the desired stoichiometric ratios. In this connection, as shown in the schematization in FIG. 2, the proportional servo-valves 21 and 22 operate directly, that is to say, they comprise a hydraulic member 39 for controlling the pin 40 of the injector 41, represented schematically, which varies its sectional area of flow, thereby acting directly upon the causes which could give rise to an alteration in the mixing conditions in the chamber 10a. As the feeding pressures of the components A and B are kept at a constant value, the feeding rate will also as a result be constant and the degree of mixing of the components will therefore be constant and even.

It will be clear, from what has been described and shown in the accompanying drawings, that an apparatus has been provided for feeding and metering chemical components to a high pressure mixing head, which makes use of piston pumping units for feeding and metering the components, which are controlled by means of a single hydraulic constant-pressure pump, and of only two proportional servo-valves in the component circuit, which are controlled according to the flow rates of the components themselves, thus making it possible to act directly upon the causes which would tend to alter the conditions in which the components are injected into the mixing chamber; therefore not only is it possible to keep the values of the pressures and the flow rates of the components constant, by acting on a single control member, but also to substantially simplify the apparatus itself and its operation, thereby reducing the causes of breakdowns or inefficient functioning.

What is claimed is:

1. An apparatus for feeding and metering fluid components to a high pressure mixing head comprising at least a first and second feeding assembly, each feeding assembly comprising a piston type pumping unit actuated by a piston type hydraulic control unit, each of said pumping units being connected to a respective storage tank for the component and, respectively, to a component inlet in a mixing chamber of the mixing head, the control units of said first and second feeding assemblies being connected to a common hydraulic fluid source having constant pressure so that said fluid components are fed into said mixing head at a constant pressure, and in which each pumping unit is connected to the component inlet aperture in the mixing chamber by means of a flow control servo-valve, and means to control said servo-valves in relation to the flow rate of the respective fluid component to keep the rate of flow and pressure at a constant value.

2. An apparatus as claimed in claim 1, in which said servo-valves controlling the flows of the components to be mixed are of the proportional type.

3. An apparatus as claimed in claim 1, in which said component flow control valves are controlled in relation to the speed of the pistons of the component pumping units.

4. An apparatus as claimed in claim 1, in which the hydraulic control units of the feeding and metering assemblies are of the double-acting type and are connected to a single hydraulic pump of the constant pressure type and, respectively, to the hydraulic control fluid tank, by means of a solenoid valve.

5. An apparatus as claimed in claim 3, comprising sensing means for sensing the speed of the pistons of the component feeding and metering assemblies and an operative connection for transmiting a flow rate signal to the data input of a processing unit which compares said flow rate signal with reference signals, the signal outputs of said processing unit being operatively connected with control members of said flow control servo-valves.

* * * * *